Sept. 13, 1960 G. G. SPRATT 2,952,421
METHOD OF OPERATING A HELICOPTER FOR TOWING
Filed May 13, 1953 3 Sheets-Sheet 1

INVENTOR.
George G. Spratt
BY Edward G. Vanderlich
Agent

Sept. 13, 1960 G. G. SPRATT 2,952,421
METHOD OF OPERATING A HELICOPTER FOR TOWING
Filed May 13, 1953 3 Sheets-Sheet 2

INVENTOR.
George G. Spratt
BY Edmund G. Vanderlip
agent

Sept. 13, 1960 G. G. SPRATT 2,952,421
METHOD OF OPERATING A HELICOPTER FOR TOWING
Filed May 13, 1953 3 Sheets-Sheet 3

INVENTOR.
George G. Spratt
BY Edward G. Vanderlip
agent

United States Patent Office 2,952,421
Patented Sept. 13, 1960

2,952,421

METHOD OF OPERATING A HELICOPTER FOR TOWING

George G. Spratt, Clinton, Conn., assignor, by mesne assignments, to Boeing Airplane Company, Seattle, Wash., a corporation of Delaware Filed May 13, 1953, Ser. No. 354,830

3 Claims. (Cl. 244—3)

This invention relates to a method of operating a helicopter for towing objects over the surface of the earth, such as disabled trucks, boats and military equipment.

Although the desirability of being able to tow with helicopters has been recognized for some time, previous attempts have not been successful.

I have discovered a helicopter towing method whereby it has been possible to pull deeply mired trucks out of the sand and tow boats of considerable size successfully.

The principal object of this invention is to provide a method whereby very high tow forces may be applied with a helicopter.

Another object of this invention is to provide a tow method permitting maximum towing force to be applied without loss of control of the helicopter.

A further object of this invention is to provide a towing method that acts to stabilize the helicopter in flight.

These and other objects will become apparent when the following specification is read in conjunction with the accompanying drawings wherein.

In all of these figures vector lines are shown to disclose the action in relationship to the various forces involved.

The helicopter shown in all of the figures is of conventional tandem construction and includes a control system such as that shown in Patent No. 2,555,577. Details of the control system are not shown in order to clarify this disclosure.

Figure 1:
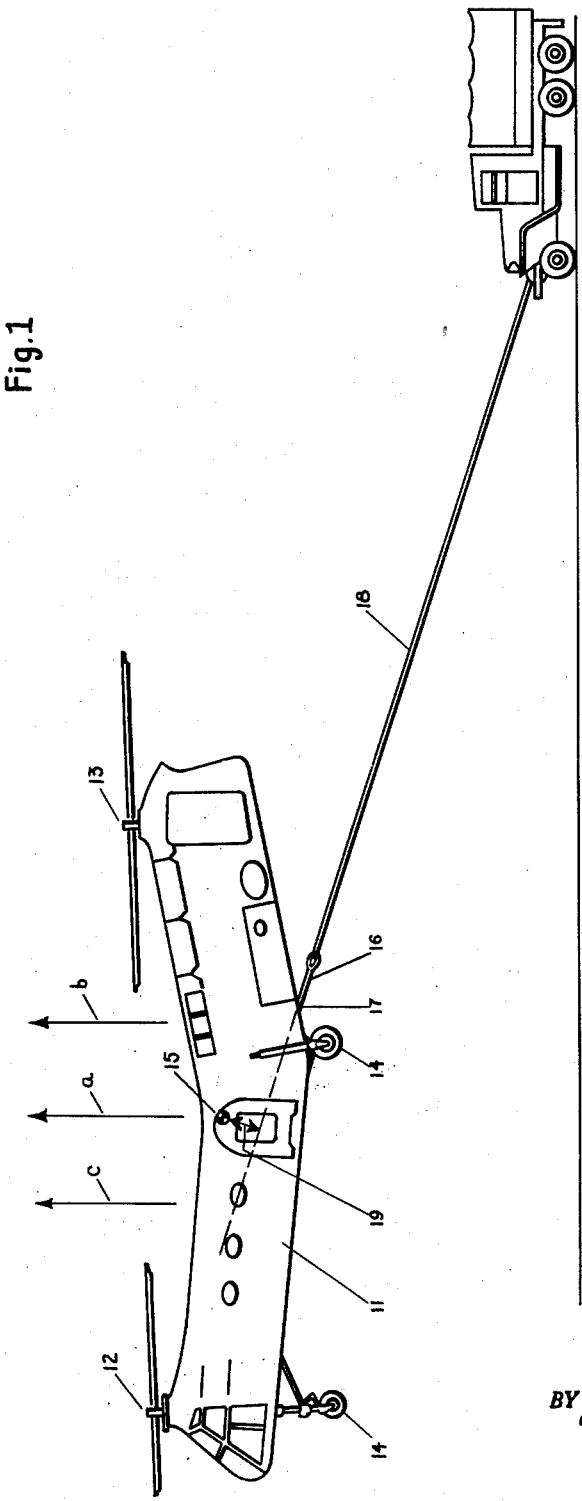
Figure 1 shows a helicopter in hovering attitude and starting to apply a load to a towed object.

Referring more particularly to Figure 1, a helicopter is shown comprising a fuselage 11 and rotors 12 and 13 mounted at either end of the fuselage. The helicopter is also provided with a landing gear 14. The rotors are driven by shaft means and a power plant contained within the fuselage in a manner similar to that shown in Patent No. 2,507,993.

When the helicopter is in a hovering attitude as shown in Figure 1, the center of thrust produced by the two rotors 12 and 13 passes vertically through the center of gravity 15 as shown by vector line $a$. To tilt the machine forwardly, the thrust of the rear rotor 13 is increased and the thrust of the front rotor 12 is decreased, resulting in a shift of the center of thrust to a position shown in line $b$. The forward pitching moment so introduced is a product of the distance the thrust has been shifted away from the center of gravity times the value of the thrust. To tilt the machine rearwardly, the thrust of the front rotor 12 is increased and the thrust of the rear rotor 13 decreased, resulting in a shift of the center of thrust to the position shown by line $c$ which produces a control moment in the same manner as just described.

Roll of the helicopter about its longitudinal axis is produced by applying a cyclic pitch change to both of the rotors to displace the rotor thrust laterally with respect to the center of gravity to produce a rolling moment in a manner well understood in the helicopter art and described in detail in Patent No. 2,555,577.

A tow hook 16 is pivotally connected to the fuselage structure at a point 17. Fastened to this tow hook is a cable 18 which has a means fastened at its other end to connect to the object to be towed.

Figure 2:
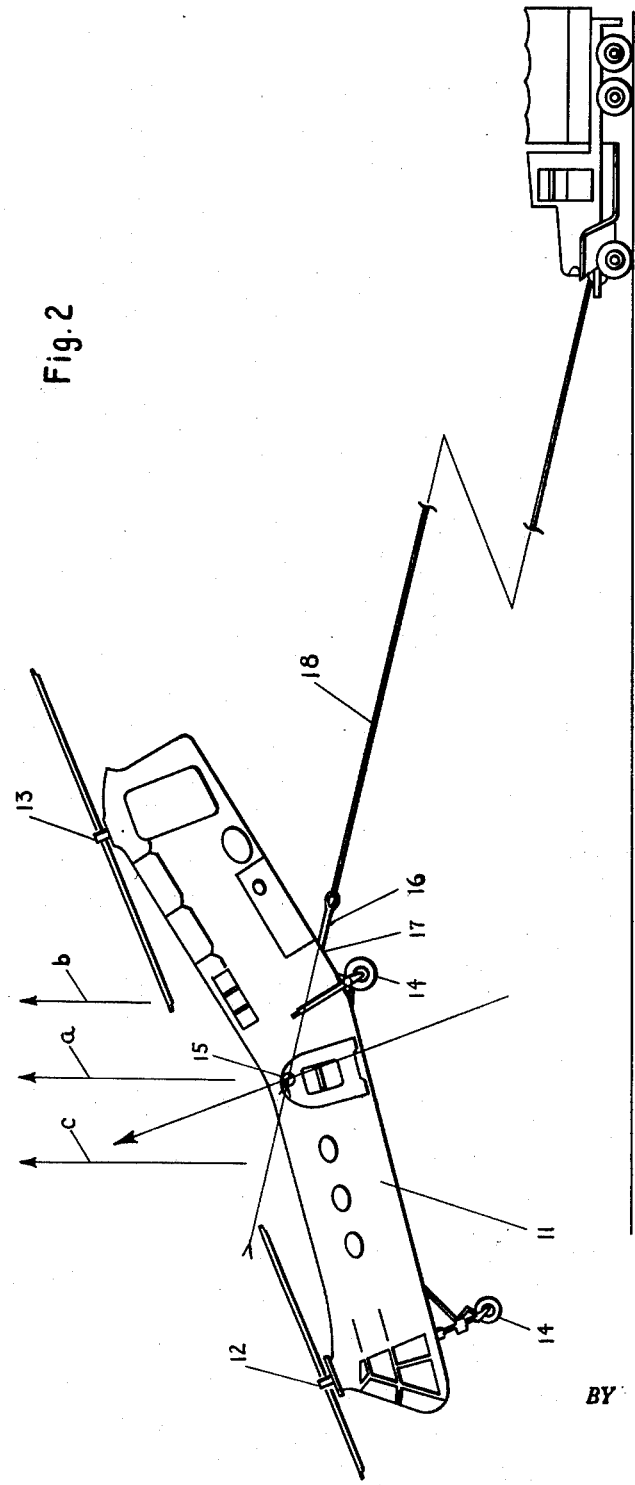
Figure 2 shows a helicopter with my towing arrangement in a normal towing attitude.

The location of the connecting point 17 is very critical. It should be located far enough below the center of gravity so that the line of tow force will produce a downward pitching moment when the helicopter starts to move forward to take up the slack on the tow cable. The location must be such that the moment arm 19 when multiplied by tow force being applied will not produce a downward pitching moment greater than the upward pitching moment that can be produced by the application of control force. As the helicopter starts to move forward the downward pitching moment, when not opposed by control force, causes the helicopter to tilt over to a position shown in Figure 2. This attitude is a result of the distance below and aft of the center of gravity chosen for the attachment point of the tow cable to the fuselage. In this attitude it will be noted that the thrust line, representing the center of thrust of the rotors, passes directly through the center of gravity and the line $e$, representing the application of tow force applied by the helicopter, also passes through the center of gravity. The attitude selected is one wherein the total of lift and towing forces is produced by the normal rated power of the helicopter. Two important results of this tow hook location point and towing arrangement are that the helicopter when in the attitude shown in Figure 2 is applying a high tow force to the object being towed, and that the thrust forces produced by the helicopter are passing through the center of gravity whereby a neutral position of the controls is achieved. This permits the use of full control, to bring the helicopter out of the towing attitude, or to take care of any sudden loss of the stabilizing effect of the cable should it break. If the thrust forces were offset from the center of gravity a dangerous upsetting moment would be produced by a cable break.

Figure 3:
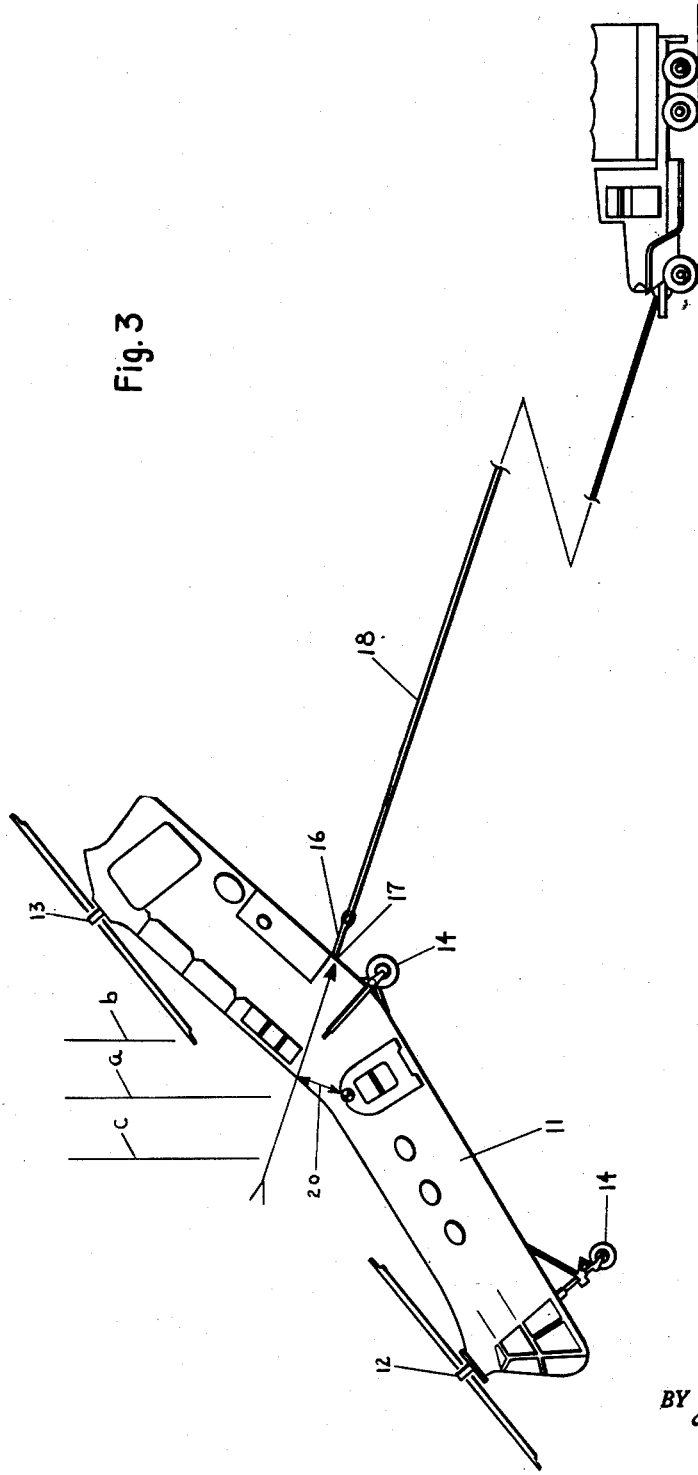
Figure 3 shows the same helicopter displaced to an attitude beyond that of normal towing.

Another result of this control arrangement is that any displacement of the helicopter from the attitude shown in Figure 2 by gust effects will cause the tow force to shift away from the center of gravity, producing a pitching moment in the correct direction to restore the helicopter to its normal towing attitude without application of control by the pilot. This is best shown by reference to Figure 3 wherein the helicopter is shown tilted in an extreme nose down position as a result of a gust. This displacement of the helicopter from its normal towing attitude causes the tow force to be displaced away from the center of gravity, resulting in a restoring pitching up moment due to the towing force being applied about the center of gravity at a distance 20.

To get out of the towing attitude it is necessary to apply a nose up control moment to slow the helicopter down and reduce the force on the tow cable. When the helicopter is tilted upwardly to slow it down, the tow force is shifted to a position below the center of gravity which acts to oppose the control force applied by the pilot. The length of the moment arm caused by the tilting of the helicopter away from the normal tow position times the tow load must be less than the control force that can be applied by the pilot resulting from the moment arm due to shift of the center of thrust times the thrust of the rotors.

This discovery has added greatly to the utility of the helicopter in that it can now be used for towing disabled commercial or military vehicles, can rescue disabled boats at sea and can be used to do many other military missions.

I claim:

1. The method of operating a helicopter having a fuselage, a rotor lift system mounted on said fuselage, a power plant for driving said rotor system, a control system for changing the position of the thrust of said lift system relative to the center of gravity of said helicopter, and towing means pivotally attached to said fuselage at a point located below and rearwardly of the center of gravity of the helicopter with reference to the direction of towing movement, comprising the steps of attaching a tow load to said towing means, adjusting said control system to cause the helicopter to hover in a position wherein the line of action of the towing force passes below the center of gravity of the helicopter, and subsequently adjusting the control system to produce a forward propulsive thrust component and to orient said fuselage in a position wherein the line of action of the towing force passes through the center of gravity of the helicopter.

2. The method of operating a helicopter having a fuselage, a rotor lift system, a power plant for driving said rotor system, controls for changing the position of thrust of said lift system relative to the center of gravity of said helicopter to produce a pitching moment about said center of gravity, and towing means pivotally attached to said fuselage at a point below and to the rear of the center of gravity of said helicopter when said helicopter is viewed in a hovering attitude, comprising the steps of attaching a tow load to said towing means, and adjusting said controls to produce a pitching moment to orient said fuselage in a position wherein the line of action of the towing force passes substantially through the center of gravity of the helicopter.

3. The method of operating a rotary wing aircraft having a rotor lift system, a control system for changing the position of the thrust of the lift system relative to the center of gravity of the aircraft, and towing means pivotally attached to said aircraft at a point below and rearwardly of the center of gravity of said aircraft, which comprises the steps of attaching a tow load to said towing means, and adjusting the control system to position the aircraft in a towing attitude such that the line of towing force passes substantially through said center of gravity.

References Cited in the file of this patent

UNITED STATES PATENTS

| | | |
|---|---|---|
| 1,893,149 | Picco | Jan. 3, 1933 |
| 2,507,993 | Piasecki | May 16, 1950 |
| 2,551,596 | Haglund | May 8, 1951 |

FOREIGN PATENTS

| | | |
|---|---|---|
| 184,492 | Great Britain | Nov. 14, 1923 |